United States Patent [19]

Bingo et al.

[11] 4,101,769
[45] Jul. 18, 1978

[54] METHOD FOR DIRECT MEASUREMENT OF BETA-RAY ABSORBED DOSE RATE AND AN INSTRUMENT THEREFOR

[75] Inventors: Kazuyoshi Bingo; Katsuo Kawai, both of Tokai, Japan

[73] Assignee: Japan Atomic Energy Research Institute, Tokyo, Japan

[21] Appl. No.: 730,082

[22] Filed: Oct. 6, 1976

[30] Foreign Application Priority Data

Oct. 6, 1975 [JP] Japan ................................ 50-120531

[51] Int. Cl.² ............................................. G01T 1/20
[52] U.S. Cl. ............................... 250/361 R; 250/328; 250/336
[58] Field of Search ............... 250/252, 364, 328, 361, 250/336

[56] References Cited

U.S. PATENT DOCUMENTS

| 2,943,199 | 6/1960 | Konneker | 250/336 |
| 3,089,032 | 5/1963 | Gouplil et al. | 250/364 |
| 3,610,928 | 10/1971 | Thomas | 250/328 |
| 3,646,347 | 2/1972 | Farmer et al. | 250/336 |

Primary Examiner—Harold A. Dixon
Attorney, Agent, or Firm—Browdy and Neimark

[57] ABSTRACT

A method and an instrument are, herein, disclosed for measuring the absorbed dose rate of beta-ray in sites of the human body. The instrument of this invention consists of a thin scintillator, a linear amplifier, a pulse selector having disposed in parallel therein a plurality of pulse height selection mechanisms for selectively setting the lower and upper limits of pulse height discrimination according to an epidermal thickness of human tissue, and a dose rate indicator. The method and the apparatus of this invention are characterized by making the relationship between the counting rate per fluence rate and the maximum energy of beta-ray equal to the relationship between the absorbed dose rate per fluence rate and the maximum energy of beta-ray, and therefore, the absorbed dose rate can be measured independent of the energy of beta-ray.

4 Claims, 5 Drawing Figures

METHOD FOR DIRECT MEASUREMENT OF BETA-RAY ABSORBED DOSE RATE AND AN INSTRUMENT THEREFOR

DETAILED DESCRIPTION OF THE INVENTION

This invention relates to a simple method for measuring an absorbed dose rate of beta-ray and an instrument therefor. To be more specific, this invention relates to a method for readily determining the absorbed dose rate or beta-ray absorbed by the human body in a radiation field where there is a danger of the human body being exposing to beta-ray radiation, and to an instrument for direct measurement of said dose rate.

To measure dose rate in a radiation field for the purpose of protecting the human body against radiation, ionization chamber and GM survey meter is employed for gamma-ray, and REM counter for neutrons. But no such handy dosimeter exists for measuring absorbed dose rate of beta-ray. A major reason for the difficulty in measurement of beta-ray absorbed dose rate is that, first, beta-ray has a greater absorption coefficient than other radiations, and that therefore, its absorbed dose varies not only depending upon the energy of incident beta-ray but also upon the epidermal thickness of human tissue (or depth in terms of $mg/cm^2$) to be measured.

In this connection, reference should be made to FIG. 1 which shows the relationship between absorbed dose rate of beta-ray per fluence rate (in terms of $(rad/hr)/(n/cm^2 \cdot sec)$) and the maximum energy of beta-ray. In the figure, curve 1 indicates the absorbed dose rate of beta-ray per fluence rate delivered in a skin whose epidermal thickness is 7 $mg/cm^2$, whereas curve 2 indicates such dose rate in the finger tip where the thickness is 40 $mg/cm^2$.

We now describe two conventional methods for measuring the absorbed dose rate of beta-ray. The first method is to use a radiation survey meter employing two filters of different thickness. Since beta-ray is easily attenuated by passing through matter, a level indicated by a survey meter using a thin filter comes out differently from one indicated by using a thick filter. This difference in the indicated levels suggest the presence of beta-ray. But this method does not allow direct measurement of absorbed dose rate of beta-ray, for said difference in the levels indicated by the survey meter is not directly correlated with the absorbed dose rate of beta-ray per fluence rate shown in FIG. 1. So, in order to measure the absorbed dose of beta-ray according to this method, the energy of indicated beta-ray must be determined by some means, whereupon said difference is multiplied by a constant that corresponds to the thus determined energy.

The second method is measurement by an extrapolation ionization chamber. But the electrode on the side of the chamber where beta-ray is introduced is so thin as several $mg/cm^2$, and the distance between electrodes is sometimes less than several hundreds of microns. Therefore, the slightest change in the pressure of air caused by the movement of an inspector may result in error of measurement. To avoid this possibility and insure accurate measurement, the measurement system of the extrapolation ionization chamber is placed in a closed vessel. Therefore, this type of ionization chamber is not generally suitable for measurement of the absorbed dose rate of beta-ray in usual radiation fields or the absorbed dose in the human body contaminated by beta-ray radiation.

Accordingly, the advent of a handy method for measurement of the absorbed dose rate of beta-ray and a direct measuring instrument therefor has long been desired in the field of radiation protection.

Therefore, one of the main objects of this invention is to provide a method for readily measuring the absorbed dose rate of beta-ray.

Another object of this invention is to provide a portable instrument for directly measuring the absorbed dose rate of beta-ray.

Other objects and advantages of this invention will become apparent as the pages develop in the following.

A preferred embodiment of the invention is further described which makes reference to the accompanying drawings in which.

Figure 4:
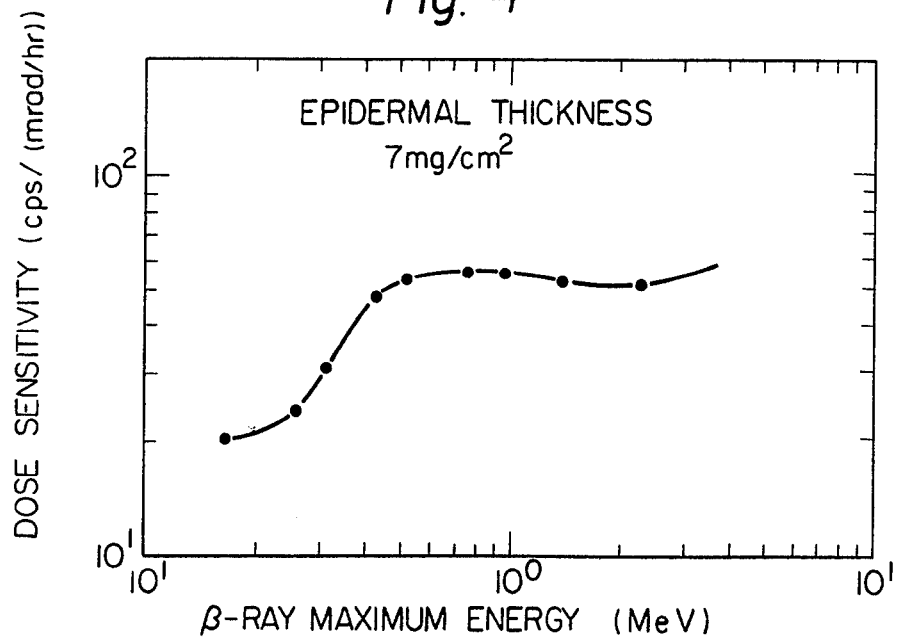
Figure 5:
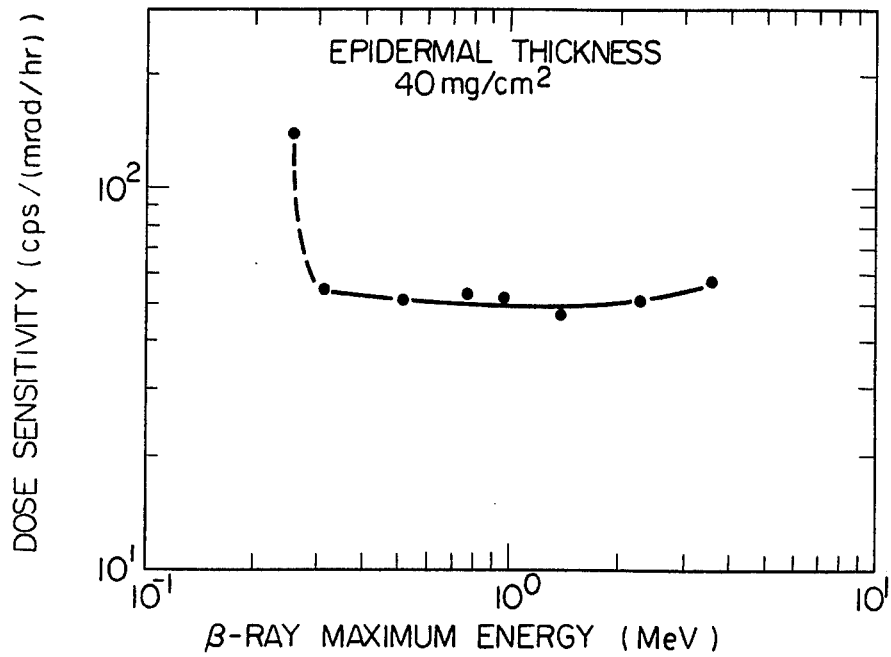

FIG. 4 is a graph showing the results of one preferred embodiment of this invention in which pulses between 2 and 80 channel in the multichannel analyzer were counted; and FIG. 5 is a graph showing the results of one preferred embodiment of this invention in which pulses between 26 and 86 channel in the multichannel analyzer were counted.

Figure 1:
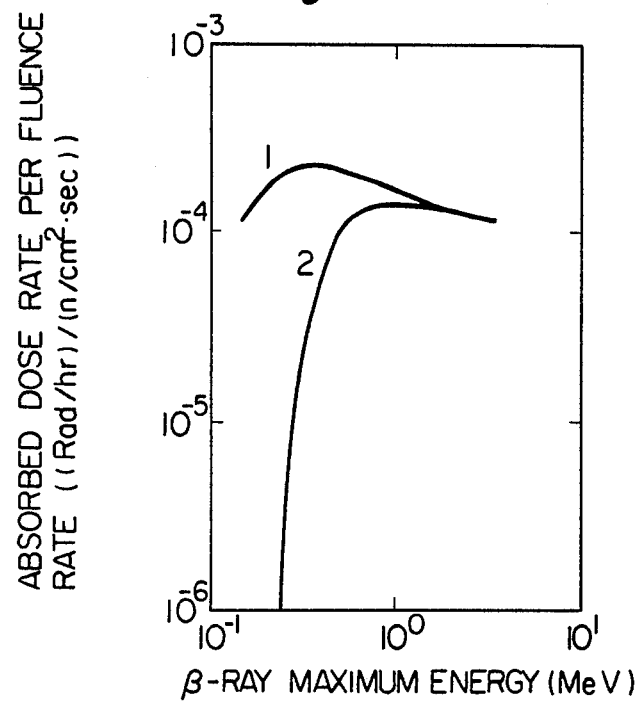
FIG. 1 is a graph showing the relationship between absorbed dose rate of beta-ray per fluence rate and the maximum energy of beta-ray.

The most important aspect of this invention is that it is able to measure the absorbed dose rate of beta-ray without information about other factors such as the energy of beta-ray by making the correlation between the counting rate of beta-ray per fluence rate (unit: $(counts/sec)/(n/cm^2 \cdot sec)$) and the maximum energy of beta-ray equal to the one indicated by curve 1 or 2 in FIG. 1.

One embodiment of the instrument for directly measuring the absorbed dose rate of beta-ray according to this invention will be described by reference to the attached drawings.

Figure 2:
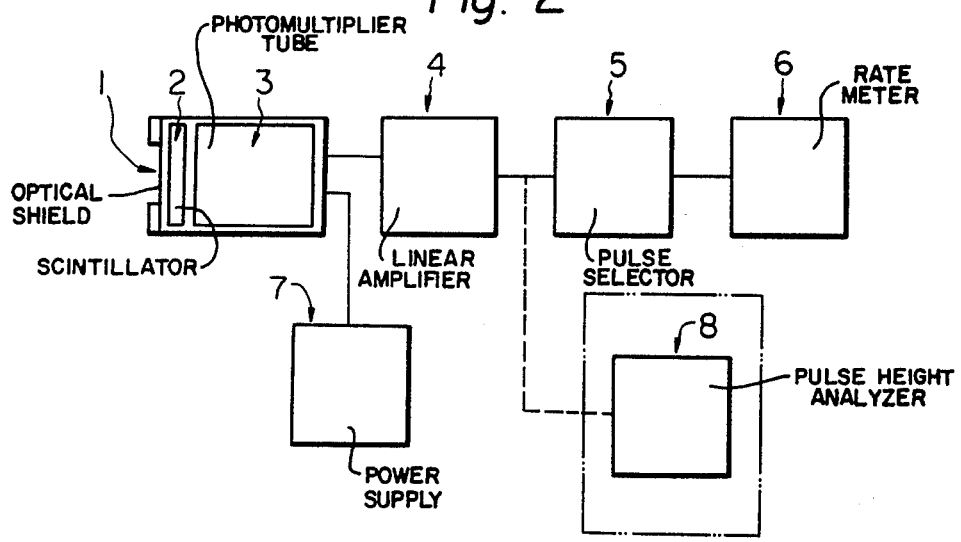
FIG. 2 is a block diagram of the instrument of this invention.
Figure 3:
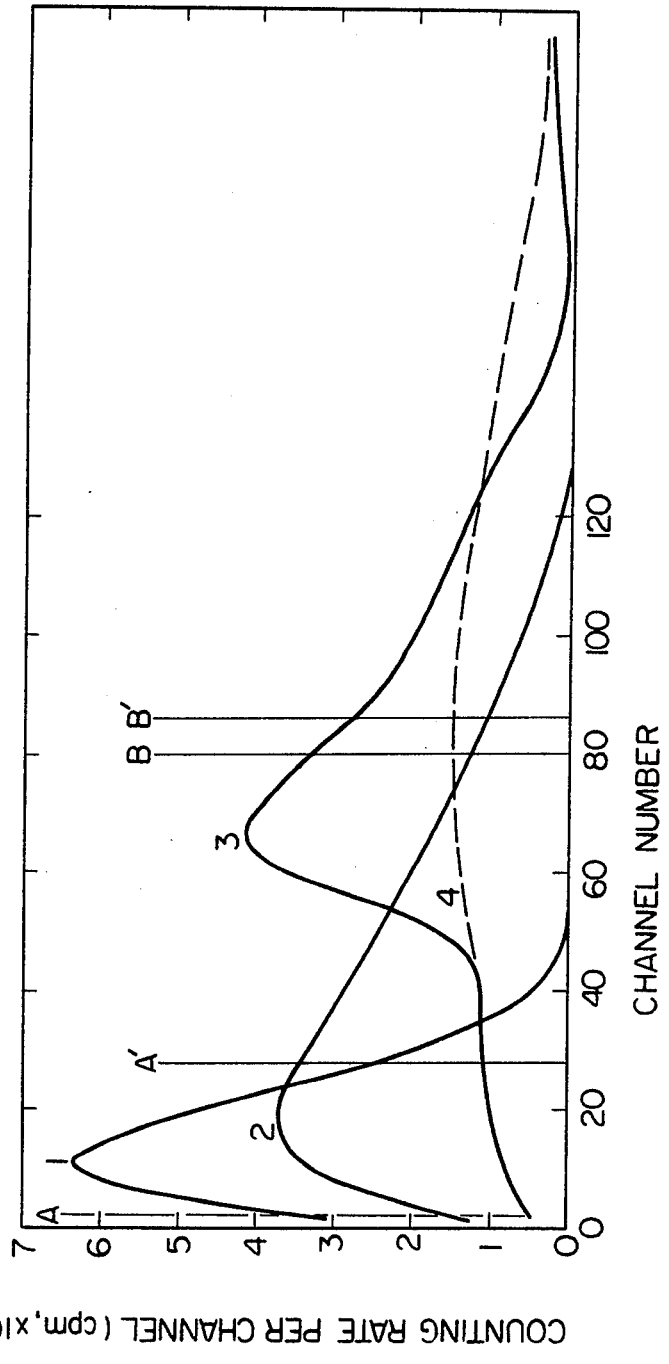
FIG. 3 is a graph showing the pulse height distribution and one embodiment for determination of the lower and the upper limits for pulse height selection of beta-ray of various kinds of nuclides.

FIG. 2 is a block diagram of the instrument for measuring the absorbed dose rate of beta-ray according to this invention. In the figure, beta-ray, passing through an optical shield 1, falls upon a scintillator 2 to be converted to light, and thereafter is multiplied by a photomultiplier tube 3 to be outputted as pulse. The pulses are amplified by a linear amplifier 4, and only pulses of a specified pulse height are shaped by a pulse selector 5, and counted by a dose rate indicator (rate meter) 6. The instrument is also provided with a high voltage power supply 7. When a pulse height analyzer 8 is substituted for the pulse selector 5, and beta-ray is measured by using a scintillator thicker than the range of beta-ray, pulse height distributions of beta-ray shown in FIG. 3 are obtained. The horizontal axis in said figure represents a pulse height (the number of channels) and the vertical axis represents the counting rate per channel. Curves 1, 2, 3 and 4 represent, respectively, the pulse height distributions of $^{60}Co$ (maximum energy of 0.31 MeV) beta-rays, $^{204}Tl$ (0.766 MeV) beta-rays, $^{90}Y$ beta-rays when a thin scintillator was used, and $^{90}Y$ beta-rays when a thick scintillator used. A and B indicate the lower the upper limits, respectively, for pulse height discrimination when the epidermal thickness was 7 mg/cm$^2$, and A' and B' represent the lower and upper limits when said thickness was 40 mg/cm$^2$.

The method for measurement absorbed dose rate of beta-ray according to this invention is now described by taking the above three nuclides as example. The absorbed dose rate of beta-ray unit: [(rad/hr)/($n$/cm$^2$·sec)] can be directly measured if the counting rate of a measuring instrument is adjusted to have a proportional relation with the absorbed dose rate per fluence rate within range of energy, for instance, from 0.1 to 4 MeV.

Let us write $D_7(^{60}Co)$, $D_7(^{204}Tl)$ and $D_7(^{90}Y)$ for the absorbed dose rates per fluence rate of $^{60}Co$, $^{204}Tl$ and $^{90}Y$ (the epidermal thickness is 7 mg/ch$^2$), respectively. If $D_7(^{60}Co)$ is 100, then $D_7(^{204}Tl)$ and $D_7(^{90}Y)$ are 83 and 55, respectively. Let the counting rate per fluence rate of beta-ray for $^{60}Co$, $^{204}Tl$ and $^{90}Y$ of pulses having the pulse height value in between the lower limit A and upper limit B be replaced by $C_{A,B}(^{60}Co)$, $C_{A,B}(^{204}Tl)$ and $C_{A,B}(^{90}Y)$, respectively. If the proportion of $C_{A,B}(^{60}Co)$, $C_{A,B}(^{204}Tl)$, and $C_{A,B}(^{90}Y)$ can be adjusted to that of 100:83:55 by selecting suitable values of A and B, then the following relationship is obtained:

$$\frac{D_7(^{60}Co)}{C_{A,B}(^{60}Co)} = \frac{D_7(^{204}Tl)}{C_{A,B}(^{204}Tl)} = \frac{D_7(^{90}Y)}{C_{A,B}(^{90}Y)} = k \quad (1)$$

The same relationship will be established by selecting appropriate levels of A and B for other nuclides such as $^{14}C$(0.156 MeV), $^{45}Ca$, $^{90}Sr$, $^{198}Au$, $^{210}Bi$, $^{32}P$, and $^{106}Rh$(3.55 MeV). A measurement system to be employed in this invention is therefore such that only pulses of a pulse height within the range of from A to B are counted. The absorbed dose rate is obtained by multiplying the counting rate by the constant $k$ (counting rate - dose rate conversion coefficient). Since the relationship expressed by the formula (1) holds good over a wide range of radiation energy, the absorbed dose rate of beta-ray can be measured irrespective of (or without information about) its energy.

Let us now specify the lower limit A and upper limit B of pulse height from the curves 1, 2 and 4 in FIG. 3.

FIG. 3 is a graph showing the pulse height distributions and one embodiment for determination of the lower and the upper limits for pulse height selection of beta-ray of various kinds of nuclides. If they are specified so that the ratio of $C_{A,B}(^{60}Co)$ to $C_{A,B}(^{204}Tl)$ will be 100:83, then the $C_{A,B}(^{90}Y)$ is smaller than 55. If they are specified so that the ratio of $C_{A,B}(^{60}Co)$ to $C_{A,B}(^{90}Y)$ may be 100:55, then $C_{A,B}(^{204}Tl)$ results in a level greater than 83. After all, the proportion of the three counting rates cannot be adjusted to that of 100:83:55. This is because the curve 4 ($^{90}Y$) does not contain many pulses of a small pulse height. So, in order to increase such pulses without varying other factors such as amplification factor of the linear amplifier, a scintillator thinner than the range of $^{90}Y$ beta-ray was employed. High energy beta-ray from $^{90}Y$ release only part of its energy and be converted to light and then to pulse, which has small pulse height compared with a pulse caused by high energy beta-ray fully released its energy in a scintillator thicker than the range. Therefore, a pulse height distribution of $^{90}Y$ beta-rays, measured with a thin scintillator, shows the same shape distribution shown in FIG. 3 as the curve 3. On the other hand, beta-ray of $^{60}Co$ and $^{204}Tl$ having low energy loses all of its energy in the scintillator, and so, a pulse height distribution it provides is not different from the case where a thick scintillator was used. If the lower limit A and the upper limit B are specified from the curves 1, 2 and 3 of FIG. 3, the relationship represented by the formula (1) is easily satisfied with an allowance in the range of ±5%; in other words, the conversion constant $k$ is obtained with an allowance of ±5%. A similar proportional relationship could be obtained with respect to other nuclides such as $^{14}C$, $^{137}Cs$ and $^{210}Bi$. With an error of ±15% being allowed, such proportional relationship can be obtained over a wide range of beta-ray energy.

A similar method may be applicable to measure an absorbed dose rate in the finger tip epidermal thickness is 40 mg/cm$^2$. Let us write $D_{40}(^{60}Co)$, $D_{40}(^{204}Tl)$ and $D_{40}(^{90}Y)$ for the absorbed dose rates of beta-ray per fluence rate (epidermal thickness is 40 mg/cm$^2$) of $^{60}Co$, $^{204}Tl$ and $^{90}Y$, respectively. Since the absorbed dose rate of lower energy beta-ray (see the curve 2 in FIG. 1) is very small, a lower limit of pulse height discrimination to be counted should be specified to be as great as A'. An upper limit B' is then specified, so as to satisfy the following relationship:

$$\frac{D_{40}(^{60}Co)}{C_{A',B'}(^{60}Co)} = \frac{D_{40}(^{204}Tl)}{C_{A',B'}(^{204}Tl)} = \frac{D_{40}(^{90}Y)}{C_{A',B'}(^{90}Y)} = k' \quad (2)$$

In this formula, $C_{A',B'}(^{60}Co)$, $C_{A',B'}(^{204}Tl)$ and $C_{A',B'}(^{90}Y)$ represent the counting rates for counting the only pulses having a pulse height within the range of A' to B' when beta-ray of a fluence rate from $^{60}Co$, $^{204}Tl$ and $^{90}Y$, respectively, was applied. A' and B' in FIG. 3 are the lower and upper limits of pulse height so selected as to satisfy the relationship represented by the formula (2). The absorbed dose rate of beta-ray is obtained by multiplying the counting rate by the conversion constant $k'$ according to the manner observed in the measurement where the epidermal thickness was 7 mg/cm$^2$. The same procedure applies to measurement of the absorbed dose rate of beta-ray in other tissue.

In the next place, we describe more fully the pulse selector 5. It selectively takes in only those pulses of a pulse height in a specified range (for example, pulses of a pulse height ranging from the lower limit A to the upper limit B as specified in FIG. 3) and shapes the same. The shaped pulses are then counted by the dose rate indicator 6. The pulse selector has the same function as a single channel analyzer, and has plural mechanisms in parallel for setting the lower and upper limits of pulse height discrimination. By this arrangement, any one of the pairs of pulse height selection variable mechanisms that are present in combination in the pulse selector 5, such as a pair of variable mechanisms for selecting the upper and lower limits of pulse height in measurement of the absorbed dose rate in a place having 7 mg/cm$^2$ of epidermis, a pair of variable mechanisms for selection of the same in measurement of the absorbed dose rate in a place containing 40 mg/cm$^2$ of epidermis, and so forth, can be actuated simply by an external rotary switch.

In order to measure the absorbed dose rate of beta-ray in a radiation field of beta-rays and gamma-rays, a plastic filter may be placed at the front of the optical shield shown in FIG. 2. Since beta-ray is attenuated by the filter, the difference between a level indicated by the dose rate indicator in the absence of the filter and the one indicated when the filter is used suggests the absorbed dose rate of beta-ray. When an acryl filter 5 mm thick is used, beta-ray from $^{90}$Y having 2.27 MeV of maximum energy is attenuated by more than 99% and fails to be counted, but gamma-ray from $^{137}$Cs of a energy of 662 KeV is attenuated by only 1.6% by the same filter. This fact may well support our conclusion that the difference between a level obtained by using the filter and that in the absence of such filter shows the absorbed dose rate of beta-ray.

The invention is further illustrated but not limited as to its scope by the following examples.

EXAMPLE I

Here, a dose sensitivity, defined as a counting rate per absorbed dose rate, is introduced. The dose sensitivity is an indication of the examination of whether or not the relationship in the equation (1) is obtained. If the relationship between the counting rate per fluence rate and the maximum energy of beta-ray could be made equal to the relationship between the absorbed dose rate per fluence rate and the maximum energy of beta-ray, i.e., the relationship given in the equation (1) could be obtained, a dose sensitivity is constant independent of the energy of beta-ray.

$$\left( \frac{C_{A,B}(^{60}Co)}{D_T(^{60}Co)} = \frac{C_{A,B}(^{204}Tl)}{D_T(^{204}Tl)} = \frac{1}{K} = \right.$$

$$\frac{\text{counting rate/fluence rate}}{\text{absorbed dose rate/fluence rate}} = \frac{\text{counting rate}}{\text{absorbed dose rate}} =$$

$$\left. \text{dose sensitivity} = \text{constant} \right)$$

On the contrary, if the dose sensitivity as a function of beta-ray energy is constant, the relationship in the equation (1) is obtained. Therefore, the dose sensitivity is a good indication.

EXAMPLE I-A

This Example was carried out by taking 7 mg/cm$^2$ of epidermis as sample.

The experimental conditions are itemized below:
(1) Scintillator
  Kind: Plastic scintillator
  Size: 40$\phi$ × 2 mm
(2) Selection of pulses
  from 2 to 80 channel
(3) Dose sensitivity
  As shown in FIG. 4, the dose sensitivity of the instrument is 50 cps/(mrad/hr) and constant within ±15% for beta-ray with maximum energy from 0.4 to 3.5 MeV.
(4) Counting rate-dose rate conversion constant K
  K = 2 × 10$^{-2}$ (mrad/hr)/cps
  i.e., A level in the dose rate indicator corresponding to 100 cps is 2 mrad/hr The experimental results was recorded on the graph as shown in FIG. 4.

EXAMPLE I-B

This example was carried out by taking 40 mg/cm$^2$ of epidermis as sample.

The experimental conditions are itemized below:
(1) Scintillator
  Kind: Plastic scintillator - (the same as that used in Example I-A)
  Size: 40$\phi$ × 2 mm
(2) Selection of pulses
  from 26 to 86 channel
(3) Dose sensitivity
  50 cps/(mrad/mr) ±15% Energy range from 0.3 to 3.5 MeV
  See FIG. 5
(4) Counting rate-dose rate conversion constant K'
  The graduation of the dose rate indicator is the same as that used in Example I-A (Epidermal thickness is 7 mg/cm$^2$).

The experimental results are recorded on the graph as shown in FIG. 5.

What is claimed is:

1. A method of measuring the $\beta$-ray absorbed dose rate corresponding to the epidermal thickness of tissue independently of $\beta$-ray energy by a $\beta$-ray detector including a thin scintillator, a photomultiplier, a preamplifier and an amplifier to obtain a desirable shape of pulse height distribution, said method comprising the steps of:
   preparing said thin scintillator, the thickness of said scintillator being less than the range of high energy $\beta$-rays such as $^{32}$P and $^{90}$Y $\beta$-rays;
   passing high energy particles from said $\beta$-rays through said scintillator;
   releasing only part of the energy of said particles in said scintillator;
   converting said energy into electric pulses by said $\beta$-ray detector, the height of said pulses being smaller than that of the pulses caused by said high energy particles the energy of which is fully released in said scintillator, and
   confirming that the absorbed dose rate can satisfy the following equation:

$$\overline{D}t\,(E\,\text{max}) = Kt\,\overline{C}t\,(E\,\text{max}),$$

where $\overline{D}t$ (E max), $\overline{C}t$ (E max) and K$t$ are the absorbed dose rate per fluence rate for $\beta$-rays the maximum energy of which is E max, the counting rate per fluence rate, and the conversion constant of counting rate - dose rate, respectively, and the suffix "$t$" represents the epidermal thickness of tissue and $\overline{C}t$ (E max) obtained in accordance with the steps above, by counting said pulses selected with a single channel analyzer, the lower discrimination level and window width of which are defined by the epidermal thickness of tissue.

2. An apparatus for measuring the $\beta$-ray absorbed dose rate corresponding to the epidermal thickness of tissue independently of $\beta$-ray energy, the apparatus comprising:
   (1) A $\beta$-ray detector including a thin scintillator of given thickness and a photomultiplier, said thickness of said scintillator being less than the range of high energy $\beta$-rays;
   (2) an amplifier coupled to said $\beta$-ray detector and responsive to its output for amplifying pulses from said $\beta$-ray detector;
   (3) a pulse selector coupled to said amplifier and responsive to its output for selecting only pulses having a height which is between a given lower and a given upper limit of discrimination and for shaping said pulses, said limits being defined by said epidermal thickness of tissue;
   (4) a dose rate indicator coupled to said pulse selector and responsive to its output for counting the shaped pulses received therefrom indicating the $\beta$-ray absorbed dose rate; and
   (5) a power supply for supplying power to components of the apparatus.

3. An apparatus as defined in claim 2, wherein said pulse selector includes plural means in parallel for setting and selecting said lower and said upper limit of pulse height discrimination corresponding to the epidermal thickness of tissue in interest.

4. An apparatus as defined in claim 2, wherein said β-ray detector is provided with a plastic resin filter at the front of said detector which is used for distinguishing β-rays from the mixed radiation of β-rays and γ-rays.

* * * * *